(12) United States Patent
Ono et al.

(10) Patent No.: US 8,498,443 B2
(45) Date of Patent: Jul. 30, 2013

(54) WATERMARK INFORMATION EMBEDDING DEVICE, WATERMARK INFORMATION PROCESSING SYSTEM, WATERMARK INFORMATION EMBEDDING METHOD, AND PROGRAM

(75) Inventors: Satoshi Ono, Kagoshima (JP); Shigeru Nakayama, Kagoshima (JP); Makoto Tsutsumi, Kagoshima (JP)

(73) Assignees: Kagoshima University, Kagoshima (JP); A.T Communications Co., Ltd., Tokyo (JP)

( * ) Notice: Subject to any disclaimer, the term of this patent is extended or adjusted under 35 U.S.C. 154(b) by 32 days.

(21) Appl. No.: 13/376,025

(22) PCT Filed: Jun. 2, 2010

(86) PCT No.: PCT/JP2010/059393
§ 371 (c)(1),
(2), (4) Date: Feb. 7, 2012

(87) PCT Pub. No.: WO2010/140639
PCT Pub. Date: Dec. 9, 2010

(65) Prior Publication Data
US 2012/0128199 A1    May 24, 2012

(30) Foreign Application Priority Data
Jun. 4, 2009 (JP) .................................. 2009-135301

(51) Int. Cl.
*G06K 9/00* (2006.01)
(52) U.S. Cl.
USPC .............................. 382/100; 382/162; 382/276
(58) Field of Classification Search
USPC .................. 382/100, 162, 165, 195, 240, 248, 382/276, 286
See application file for complete search history.

(56) References Cited

U.S. PATENT DOCUMENTS 8,180,102 B2 * 5/2012 Abe et al. ...................... 382/100
2003/0141375 A1 7/2003 Lawandy
(Continued)

FOREIGN PATENT DOCUMENTS

EP       0891071 A2    1/1999
JP    2003-037730 A    2/2003
(Continued)

OTHER PUBLICATIONS

Extended European Search Report regarding Application No. 10783421.0-1228 / 2439921, dated Mar. 14, 2012.

(Continued)

*Primary Examiner* — Phuoc Tran
(74) *Attorney, Agent, or Firm* — Harness, Dickey & Pierce, P.L.C.

(57) ABSTRACT

The present invention provides a watermark information embedding device, a watermark information processing system, a watermark information embedding method and program that can provide a two-dimensional code enabling detection of copying. The watermark information embedding device comprises a first wavelet transform unit (12), a watermark information embedding unit (14) and an inverse wavelet transform unit (150). The first wavelet transform unit (12) performs a discrete wavelet transform on an original image of a two-dimensional code and decomposes this into various frequency components, namely an LL component, an LH component, an HL component and an HH component. The watermark information embedding unit (14) embeds the watermark information in the HH component as a high-frequency component in an oblique direction. The inverse wavelet transform unit (150) recomposes the two-dimensional code by performing an inverse discrete wavelet transform on the HH component in which the watermark information is embedded, and on each of the frequency components namely the LL component, the LH component and the HL component.

7 Claims, 10 Drawing Sheets

U.S. PATENT DOCUMENTS

| | | | |
|---|---|---|---|
| 2003/0161496 A1* | 8/2003 | Hayashi et al. | 382/100 |
| 2004/0047489 A1* | 3/2004 | Seo et al. | 382/100 |
| 2004/0208339 A1* | 10/2004 | Abe et al. | 382/100 |

FOREIGN PATENT DOCUMENTS

| | | |
|---|---|---|
| JP | 2003-338921 A | 11/2003 |
| JP | 2004-221925 A | 8/2004 |
| JP | 2006-318328 A | 11/2006 |

OTHER PUBLICATIONS

International Search Report (in Japanese with English translation) and Written Opinion (in English) for PCT/JP2010/059393, mailed Jul. 13, 2010; ISA/JP.

English translation of Office Action for corresponding Japanese Patent Application No. 2010-200387, mailed Jan. 4, 2011.

* cited by examiner

FIG. 3
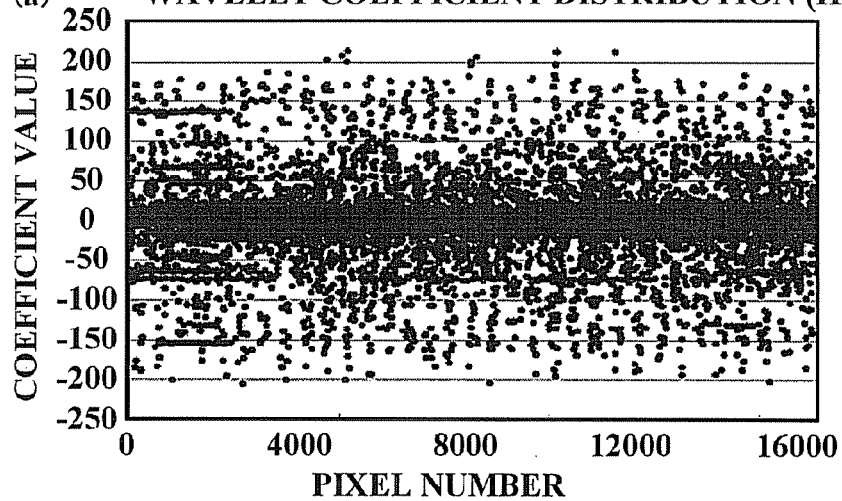
(a) WAVELET COEFFICIENT DISTRIBUTION (HL)
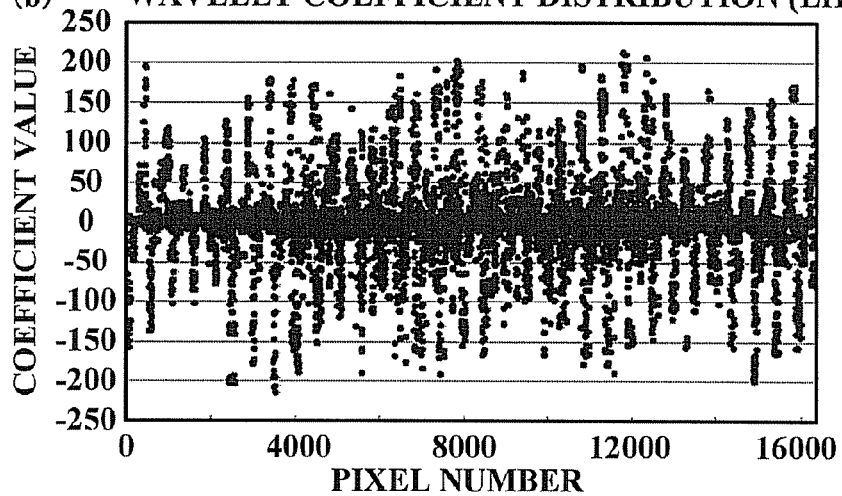
(b) WAVELET COEFFICIENT DISTRIBUTION (LH)
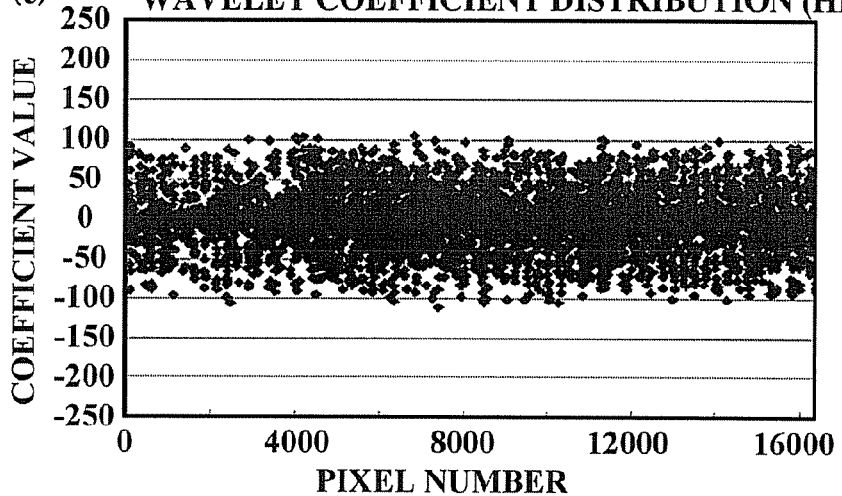
(c) WAVELET COEFFICIENT DISTRIBUTION (HH)

FIG.10
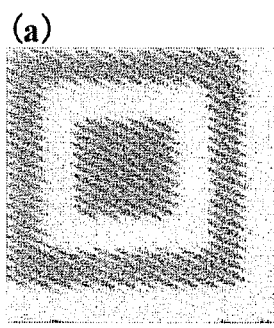
(a)
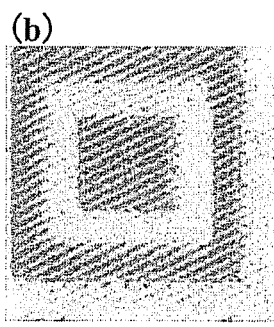
(b)
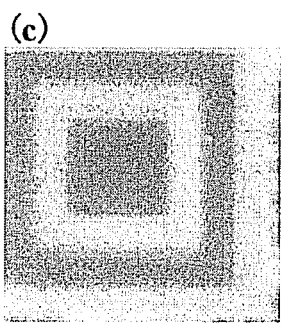
(c)
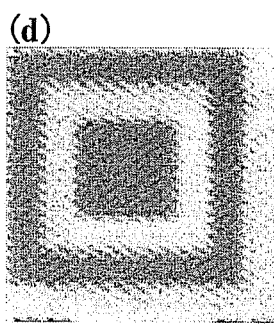
(d)

FIG.11
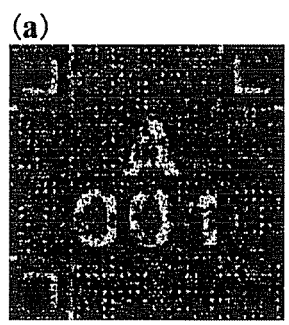
(a)
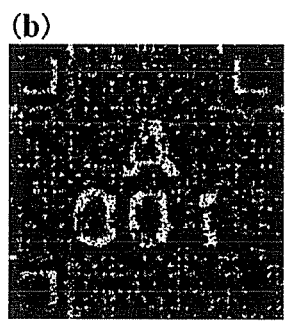
(b)
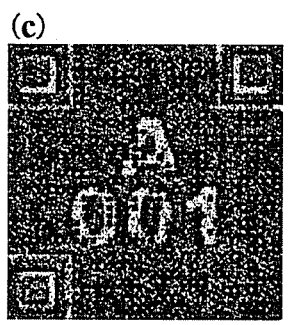
(c)

[Formula 1]

$$W_{m,n}^{(j+1,d)} = \begin{cases} w_{m,n}^{(j+1,d)} + bit \times \alpha & if \quad T_{m,n} = 0 (BLACK) \\ w_{m,n}^{(j+1,d)} & otherwise \end{cases}$$

[Formula 2]

$$W_{m,n}^{(j+1,d)} = \begin{cases} w_{m,n}^{(j+1,d)} + bit \times \alpha & if \quad T_{m,n} = 0 (BLACK) \\ w_{m,n}^{(j+1,d)} & otherwise \end{cases}$$

WATERMARK INFORMATION EMBEDDING DEVICE, WATERMARK INFORMATION PROCESSING SYSTEM, WATERMARK INFORMATION EMBEDDING METHOD, AND PROGRAM

CROSS-REFERENCE TO RELATED APPLICATIONS

This application is a 371 U.S. National Stage of International Application No. PCT/JP2010/059393, filed on Jun. 2, 2010, and claims priority to Japanese patent application No. 2009-135301, filed on Jun. 4, 2009, the disclosures of which are herein incorporated by reference in their entirety.

TECHNICAL FIELD

The present invention relates to a watermark information embedding device, watermark information processing system, and watermark information embedding method and recording medium storing program, and more particularly, to a watermark information embedding device, watermark information processing system, and watermark information embedding method and recording medium storing program that can provide a two-dimensional code enabling detection of copying.

BACKGROUND ART

A QR (Quick Response) code (registered trademark), which is one type of two-dimensional code, embeds machine-readable information in printed matter. Recently, use of QR codes with monetary value has expanded, as exemplified by airplane tickets (for example, see Patent Literature 1).

PRIOR ART DOCUMENT

Patent Literature

Patent Literature 1: Unexamined Japanese Patent Application KOKAI Publication No. 2006-318328.

DISCLOSURE OF INVENTION

Problems to be Solved by the Invention

Consequently, development of a system for detecting copies of two-dimensional codes as exemplified by QR codes has become a pressing issue.

In consideration of the foregoing, it is an object of the present invention to provide a watermark information embedding device, watermark information processing system, and watermark information embedding method and recording medium storing program that can provide a two-dimensional code enabling detection of copying.

Means for Solving the Problem

In order to achieve the above object, the watermark information embedding device according to a first aspect of the present invention comprises: a first wavelet transformer for performing a wavelet transform on an original image of a two-dimensional code to decompose this image into various frequency components; a watermark information embedder for embedding watermark information, as a high-frequency component in the oblique direction, in a high-frequency component in the oblique direction out of the various frequency components decomposed by the first wavelet transformer; and an inverse wavelet transformer for recomposing the two-dimensional code containing watermark information by performing an inverse wavelet transform on high frequency components other than the high-frequency component in the oblique direction, out of the various frequency components decomposed by the first wavelet transformer, and the high-frequency component in the oblique direction in which the watermark information is embedded by the watermark information embedder.

The above-described watermark information embedding device may further comprise a color component separator for separating the original image of the two-dimensional code into color components; and a color component integrator for integrating the two-dimensional code containing watermark information for each color component recomposed by the inverse wavelet transformer; wherein the first wavelet transformer performs a wavelet transform on each color component decomposed by the color component separator; and the watermark information embedder embeds the watermark information in the high-frequency component in the oblique direction of each of the color components with an embedding strength weighted in accordance with the usage frequency of each of the color components in the original image of the two-dimensional code.

In addition, the above-described watermark information embedding device may be such that the watermark information embedder executes embedding of the watermark information for a wavelet coefficient obtained through the wavelet transform, and when the wavelet coefficient in the high-frequency component in the oblique direction of the original image of the two-dimensional code after the wavelet transform has been executed (j+1) times (j is a natural number) by the first wavelet transformer is $w_{m,n}\hat{}(j+1,d)$ (where (m,n) is the position of the pixel and d is an index indicating that the wavelet coefficient is a coefficient of a high-frequency component in an oblique direction), the watermark binary image is $T_{m,n}$, the color weighting coefficient is $\alpha$ and the embedding strength is bit, the wavelet coefficient $W_{m,n}\hat{}(j+1,d)$ of the two-dimensional code containing watermark information is expressed by the following formula.

$$W_{m,n}^{(j+1,d)} + \begin{cases} w_{m,n}^{(j+1,d)} + \text{bit} \times \alpha & \text{if } T_{m,n} = 0(\text{BLACK}) \\ w_{m,n}^{(j+1,d)} & \text{otherwise} \end{cases} \quad [\text{Formula 1}]$$

In addition, a watermark information processing system according to a second aspect of the present invention comprises a watermark information embedding device and a watermark information extraction device; wherein the watermark information embedding device comprises: a first wavelet transformer for performing a wavelet transform on an original image of a two-dimensional code to decompose this image into various frequency components; a watermark information embedder for embedding watermark information, as a high-frequency component in the oblique direction, in a high-frequency component in the oblique direction out of the various frequency components decomposed by the first wavelet transformer; and an inverse wavelet transformer recomposing the two-dimensional code containing watermark information by performing an inverse wavelet transform on high frequency components other than the high-frequency component in the oblique direction, out of the various frequency components decomposed by the first wavelet transformer, and the high-frequency component in the oblique direction in which the watermark information is embedded by the watermark information embedder, and the watermark information extraction device comprises: a two-dimensional code capturer for capturing an input image of two-dimensional code containing watermark information recomposed by the inverse wavelet transformer; a second wavelet transformer for performing a wavelet transform on an input image of the two-dimensional code containing watermark information captured by the two-dimensional code capturer and producing the high-frequency components; and a watermark information extractor for extracting watermark information from a high-frequency component in an oblique direction out of the high-frequency components produced by the second wavelet transformer.

The above-described watermark information processing system may be such that when the size of the original image of the two-dimensional code is m×m and the size of the input image of the two-dimensional code containing watermark information captured by the two-dimensional code capturer is M×M (M=m×2 j (j is a natural number)), the second wavelet transformer performs a wavelet transform on the input image of the two-dimensional code containing watermark information $\log_2$ (M/m) times.

The above-described watermark information processing system may be such that the second wavelet transformer performs a wavelet transform k+$\log_2$ (M/m) times (k is a natural number) on the input image of the two-dimensional code containing watermark information captured by the two-dimensional code capturer and then performs an inverse wavelet transform k times; and the watermark information extractor extracts watermark information from the sum of the high-frequency component in the oblique direction produced by performing the wavelet transform $\log_2$ (M/m) times, and the high-frequency component in the oblique direction produced by performing the wavelet transform k+$\log_2$ (M/m) times and then performing the inverse wavelet transform k times.

A watermark information embedding method according to a third aspect of the present invention comprises: a first wavelet transform step for performing a wavelet transform on an original image of a two-dimensional code to decompose this image into various frequency components; a watermark information embedding step for embedding watermark information, as a high-frequency component in the oblique direction, in a high-frequency component in the oblique direction out of the various frequency components decomposed by the first wavelet transform step; and an inverse wavelet transform step for recomposing the two-dimensional code containing watermark information by performing an inverse wavelet transform on high frequency components other than the high-frequency component in the oblique direction, out of the various frequency components decomposed by the first wavelet transform step, and the high-frequency component in the oblique direction in which the watermark information is embedded by the watermark information embedding step.

Furthermore, a non-transitory computer-readable recording medium storing a program according to a fourth aspect of the present invention causes a computer to execute a procedure comprising: a first wavelet transform procedure for performing a wavelet transform on an original image of a two-dimensional code to decompose this image into various frequency components; a watermark information embedding procedure for embedding watermark information, as a high-frequency component in the oblique direction, in a high-frequency component in the oblique direction out of the various frequency components decomposed by the first wavelet transform procedure; and an inverse wavelet transform procedure for recomposing the two-dimensional code containing watermark information by performing an inverse wavelet transform on high-frequency components other than the high-frequency component in the oblique direction, out of the various frequency components decomposed by the first wavelet transform procedure, and the high-frequency component in the oblique direction in which the watermark information is embedded by the watermark information embedding procedure.

Effect of the Invention

With the present invention, it is possible to provide a watermark information embedding device, watermark information processing system, and watermark information embedding method and program that can provide a two-dimensional code enabling detection of copying. With the watermark information processing system, it is possible to detect copying of two-dimensional codes.

BRIEF DESCRIPTION OF THE DRAWINGS

FIG. 3 is a graph showing one example of a wavelet coefficient value (coefficient value) in each pixel according to the embodiment;

FIG. 10 is a drawing showing a shading pattern for each copier;

FIG. 11 is a drawing showing an example of changes in watermark information caused by copying according to the embodiment.

BEST MODE FOR CARRYING OUT THE INVENTION

Below, an embodiment of the present invention is explained.

First, the configuration of a watermark information processing system according to this embodiment will be described with reference to the drawings. The watermark information processing system is composed of a watermark information embedding device 10 shown in FIG. 1, and a watermark information extracting device 20 shown in FIG. 4.

Figure 1:
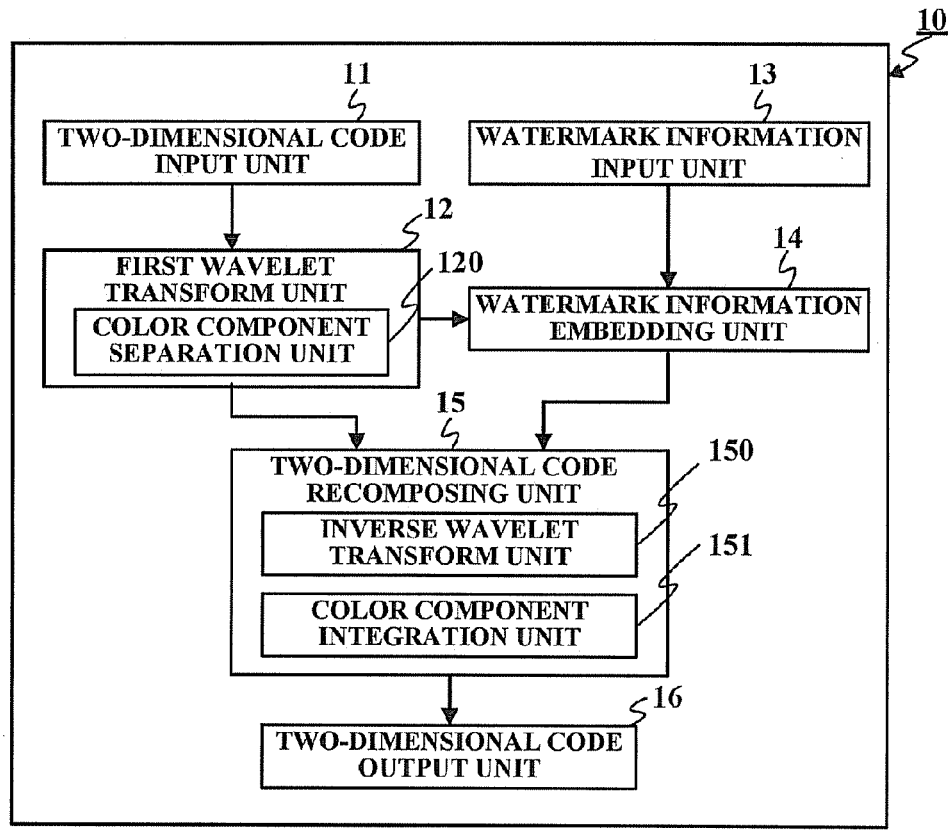
FIG. 1 is a block diagram showing an example of the configuration of a watermark information embedding device according to an embodiment of the present invention.

FIG. 1 is a block diagram showing an example of the configuration of a watermark information embedding device according to this embodiment of the present invention.

The watermark information embedding device 10 embeds watermark information in a two-dimensional code (for example, a QR (Quick Response) code (registered trademark)) that is an original image, recomposes such, and generates a two-dimensional code in which watermark information is embedded. The watermark information embedding device 10 comprises a two-dimensional code input unit 11, a first wavelet transform unit 12, a watermark information input unit 13, a watermark information embedding unit 14, a two-dimensional code recomposing unit 15 and a two-dimensional code output unit 16, as shown in FIG. 1.

The two-dimensional code input unit 11 inputs a two-dimensional code that is an original image of the embedding target of the watermark information, and supplies a two-dimensional image signal indicating the original image of the two-dimensional code to the first wavelet transform unit 12.

The first wavelet transform unit 12 is provided with a color component separation unit 120 and also executes a wavelet transform, that is one frequency analysis method, on the two-dimensional image signal input from the two-dimensional code input unit 11.

Figure 2:
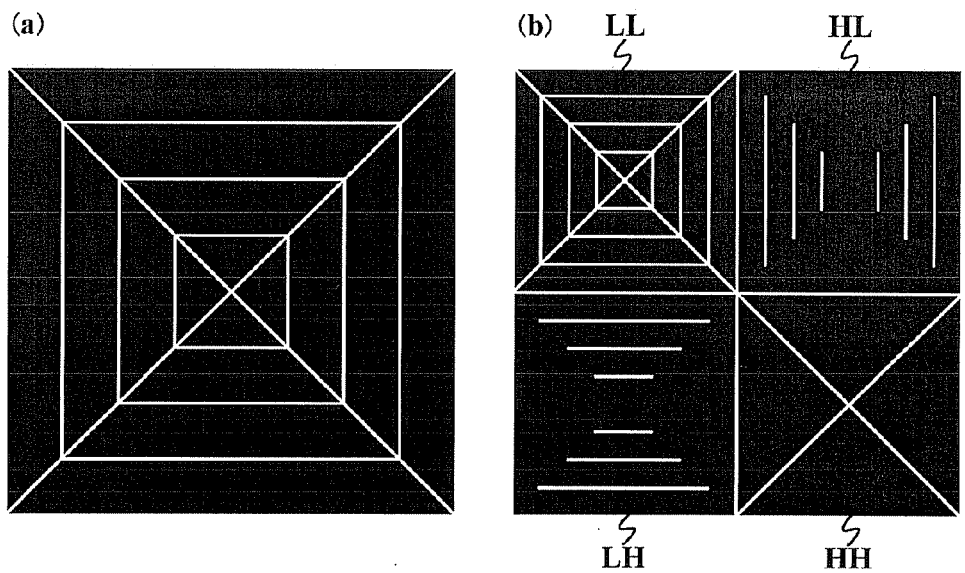
FIG. 2 is a schematic drawing for explaining a discrete wavelet transform according to the embodiment.

Specifically, after the first wavelet transform unit 12 has separated the original image of the two-dimensional code indicated by the two-dimensional image signal into its various RGB components (RGB decomposition) by means of the color component separation unit 120, a discrete wavelet transform (DWT) is performed on each of the R, G, and B color components, and through this the original image of the two-dimensional code shown in FIG. 2(a) is decomposed (band division) into frequency components such as an LL component, an LH component, an HL component and an HH component.

Here, the LL component corresponds to Multi-Resolution Approximation and is called the MRA part, while the LH component, HL component and HH component correspond to Multi-Resolution Representation and are called the MRR part. The MRA part is the low-frequency component and primarily expresses an image in which the resolution of the original image of the two-dimensional code is reduced by one-half, while the MRR part expresses the high-frequency component and primarily expresses difference information in the horizontal, vertical and oblique directions of the image. Consequently, deterioration of the image is less noticeable even if the part (edge component) where the MRR component is stronger (higher) changes somewhat.

The watermark information input unit 13 shown in FIG. 1 inputs watermark information to be embedded in the original image of the two-dimensional code and supplies this input watermark information to the watermark information embedding unit 14. In the present embodiment, watermark information having a signal length the same as the LH component, the HL component and the HH component is used as the watermark information. Signal length means image size. That is to say, the image size of the watermark information is the same as the image size of each component obtained through one wavelet transform on the original image.

The watermark information embedding unit 14 uses the difference information of each frequency component and embeds watermark information supplied from the watermark information input unit 13 as the high frequency component in the oblique direction in only the HH component out of the various frequency components decomposed by the first wavelet transform unit 12. The signal length of the watermark information and the signal length of the HH component are the same in order to embed the watermark information in the entire image size.

The reason the watermark information embedding unit 14 accomplishes embedding only in the HH component in this manner is because the two-dimensional code has the characteristic of containing numerous LH components containing an edge in the horizontal direction and HL components containing an edge in the vertical direction. As the two-dimensional code has the characteristics described above, the coefficient value of the wavelet coefficient of the LH component and HL component is large, as shown in FIG. 3. Consequently, the LH component and HL component are susceptible to the effects of noise. Accordingly, the LH component and HL component are avoided for embedding the watermark information and the watermark information is embedded as a high-frequency component in the oblique direction only in the HH component. If embedding is not undertaken in this form, there is concern that information other than watermark information could appear as noise when extracting the watermark information.

In addition, deterioration of the image is less noticeable even if the part (edge component) where the MRR component is stronger (higher) changes somewhat, as noted above. Therefore, by utilizing this property and embedding watermark information in the HH component, which is a high-frequency component, it is possible to make deterioration of the image of the two-dimensional code obtained through recomposition less noticeable.

Embedding watermark information in the two-dimensional code is executed with respect to wavelet coefficients obtained through a wavelet transform on the two-dimensional code. Here, when the wavelet coefficient in the HH component of the original image of the two-dimensional code after the wavelet transform has been executed (j+1) times by the first wavelet transform unit 12 is $w_{m,n}^{(j+1,d)}$ (where (m,n) indicates the position of the pixel and d is an index indicating that the wavelet coefficient is the HH component coefficient), the watermark binary image is $T_{m,n}$, the color weighting coefficient is $\alpha$ and the embedding strength is "bit", the wavelet coefficient $W_{m,n}^{(j+1,d)}$ of the two-dimensional code containing the watermark information is as shown in the following equation.

$$W_{m,n}^{(j+1,d)} \leftarrow \begin{cases} w_{m,n}^{(j+1,d)} + \text{bit} \times \alpha & \text{if } T_{m,n} = 0(\text{BLACK}) \\ w_{m,n}^{(j+1,d)} & \text{otherwise} \end{cases} \quad [\text{Formula 2}]$$

In this manner, the watermark information embedding unit 14 accomplishes embedding in the pixel of $T_{m,n}=0$, with a weighted embedding strength obtained by multiplying the embedding strength with a color weighting coefficient in accordance with the frequency of RGB used in the background color. The reason for multiplying by the color weighting coefficient is as follows. Calling the brightness of the RGB color components the R value, G value and B value, for example with respect to a background image in which the average value of the R value is high, when the weighted embedding strength of the R component of the watermark information is large, a large change in the hue is generated to create concern that the design of the two-dimensional code could change significantly, even if the fluctuation in the R component of the background color caused by the large weighted embedding strength of the R component is slight.

Consequently, in this case the watermark information embedding unit 14 reduces the weighted embedding strength by reducing the weighted-by-color coefficient α of the R component of the watermark information, and while reducing the amplitude of fluctuations in the R value of the post-embedding image, increases the weighted embedding strength of the G component and the B component (or either of these) of the watermark information, and increasing the fluctuation amplitude of the G value and B value (or the fluctuation amplitude of either of these) of the post-embedding image, and through this it is possible to secure extraction accuracy for the watermark information while reducing changes in the design of the two-dimensional code.

A post-copy image in general has the characteristic that the contrast increases in comparison to a pre-copy image. Consequently, the watermark information embedding unit 14 adjusts the background brightness of the original image of the two-dimensional code that is the target of embedding watermark information, which should prevent illegal copying of the two-dimensional code, and the weighted embedding strength of the watermark information, in a range in which the loss of information through copying is large.

The two-dimensional code recomposing unit 15 is provided with an inverse wavelet transform unit 150 and a color component integration unit 151. The inverse wavelet transform unit 150 accomplishes an inverse wavelet transform using each frequency component output from the watermark embedding unit 14 and the first wavelet transform unit 12. Then, the color component integration unit 151 accomplishes integration (RGB integration) of each of the RGB components after inverse transform. In this manner, the two-dimensional code recomposing unit 15 recomposes the two-dimensional code through the inverse wavelet transform unit 150 and the color component integration unit 151.

Specifically, the two-dimensional code recomposing unit 15 accomplishes an Inverse Discrete Wavelet Transform (IDWT) by the inverse wavelet transform unit 150 using the HH component in which the watermark information output from the watermark information embedding unit 14 is embedded, and the various high-frequency components, excluding the HH component, output from the wavelet transform unit 12, that is to say the LL component, the LH component and the HL component.

In other words, the two-dimensional code recomposing unit 15 replaces only the HH component out of the various high-frequency components output from the first wavelet transform unit 12 with the HH component in which the watermark information is embedded by the watermark information embedding unit 14. In this manner, the two-dimensional code recomposing unit 15 can embed watermark information in the original image of the two-dimensional code.

The two-dimensional code output unit 16 outputs the two-dimensional code in which the watermark information is embedded (two-dimensional code containing watermark information) by printing on a paper medium such as high-quality printing paper or other means.

Figure 4:
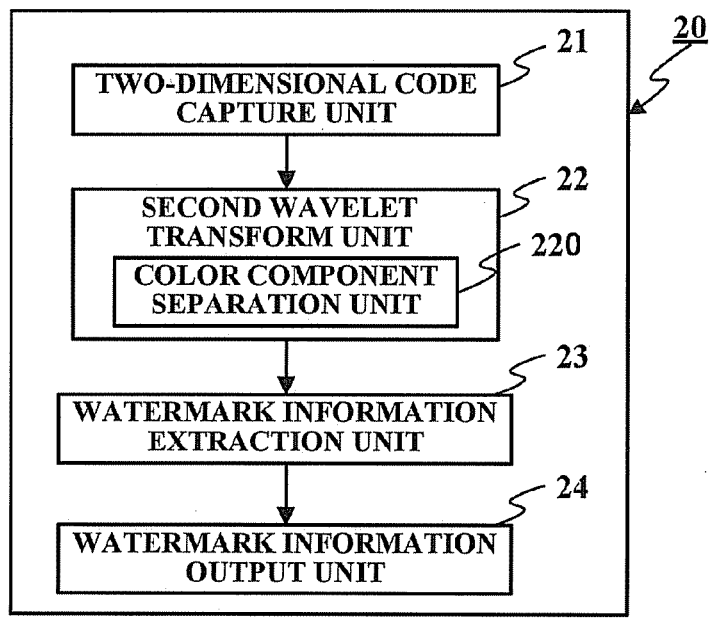
FIG. 4 is a block diagram showing an example of the configuration of a watermark information extracting device according to the embodiment.

FIG. 4 is a block diagram showing an example of the configuration of the watermark information extracting device according to the present embodiment.

The watermark information extracting device 20 is used to extract watermark information from the two-dimensional code containing watermark information, and as shown in FIG. 4, is composed of a two-dimensional code capture unit 21, a second wavelet transform unit 22, a watermark information extraction unit 23 and a watermark information output unit 24.

The two-dimensional code capture unit 21 is an image reading device of a scanner or copier and/or the like, and captures the two-dimensional code containing watermark information and supplies this as an input image to the second wavelet transform unit 22.

The second wavelet transform unit 22 has a color component separation unit 220. After decomposing the input image supplied from the two-dimensional code capture unit 21 into RGB color components (hereafter referred to as RGB decomposition) through the color component separation unit 220, the second wavelet transform unit 22 decomposes (band division) the input image into various frequency components, namely the LL component, the LH component, the HL component and the HH component, by implementing a discrete wavelet transform on each of the color components R, G and B.

The resolution of the input image supplied from the two-dimensional code capture unit 21 has a large correlation with the restoration ratio (extraction accuracy) of the watermark information, and using extraction of the watermark information it is possible to accomplish copy detection that detects whether or not the input image has been copied.

A post-copy image in general can be seen to have the characteristic that high-resolution information has been lost compared to a pre-copy image. Consequently, the higher the resolution of the two-dimensional code containing watermark information, which is the input image, the larger the difference between the absence or presence of delicate information between the pre- and post-copy images in which that watermark information is embedded, and the difference between whether or not watermark information can be extracted will become large between the input image prior to copying and after copying. Accordingly, it is possible to anticipate increased accuracy in copy detection by detecting whether or not the input image is a copied image by this difference in extractability.

However, with a high-resolution input image, the image size becomes extremely large and a large difference from the size of the original image is generated. Consequently, adjustments may be made so that the image size of the extracted watermark information becomes equal to the image size of the original image for convenience in later processing and experiments. At this time, when shrinking of the input image is simply conducted, delicate information is lost and there is a concern that the extraction accuracy of the watermark information could drop. "Shrinking of the input image is simply conducted" means for example a shrinking process using typical commercially available image processing software.

Here, the second wavelet transform unit 22 matches the input image to the size of the original image using the property that the resolution becomes ½ through the discrete wavelet transform. That is to say, when the size of the original image of the two-dimensional code is m×n (for example, n=m) and the size of the input image is M×N (for example, N=M), by setting M=m×2j (j belongs to a set of N), the second wavelet transform unit 22 shrinks the input image to the size of the original image by executing a discrete wavelet transform $j=\log_2 (M/m)$ times.

Suppose the size of the original image is 256 px×256 px (m=n=256) and the size of the input image is 2048 px×2048 px (M=N=2048). The second wavelet transform unit 22 picks out the HH component (called HH component A) after shrinking the size of the input image to 256 px×256 px by executing the discrete wavelet transform 3 ($=\log_2 (2048/256)$) times on the input image.

Furthermore, the second wavelet transform unit 22 temporarily shrinks the size of the input image to 128 px×128 px by executing the discrete wavelet transform j+1 (=4) times and then restores the size to 256 px×256 px by executing the inverse discrete wavelet transform one time, after which the HH component is picked out (called HH component B).

The watermark information extraction unit 23 extracts watermark information by normalizing the HH component picked out by the second wavelet transform unit 22. At this time, the watermark information extraction unit 23 can extract more vivid watermark information by integrating HH components obtained by DWT a differing number of times.

With the present embodiment, the sum HH component A+HH component B of the HH component A and the HH component B (summing gradation values for each pixel) is obtained as the extracted image signal showing the extracted image. Through this procedure, more clear watermark information can be extracted. It would also be fine to use in place of HH component B an HH component C obtained by executing the discrete wavelet transform k (where k is a natural number) extra times in addition to the necessary number of times and then executing the inverse discrete wavelet transform k times.

The watermark information output unit 24 outputs the watermark information extracted by the watermark information extraction unit 23.

Next, operation of a watermark information processing system provided with the above-described configuration will be explained with reference to the drawings. The explanation below is also an explanation of a watermark information embedding method and a watermark information extraction method.

The watermark information embedding device 10 starts the watermark information embedding process when the original image of the two-dimensional code is input into the two-dimensional code input unit 11 and watermark information is input into the watermark information input unit 13.

Figure 5:
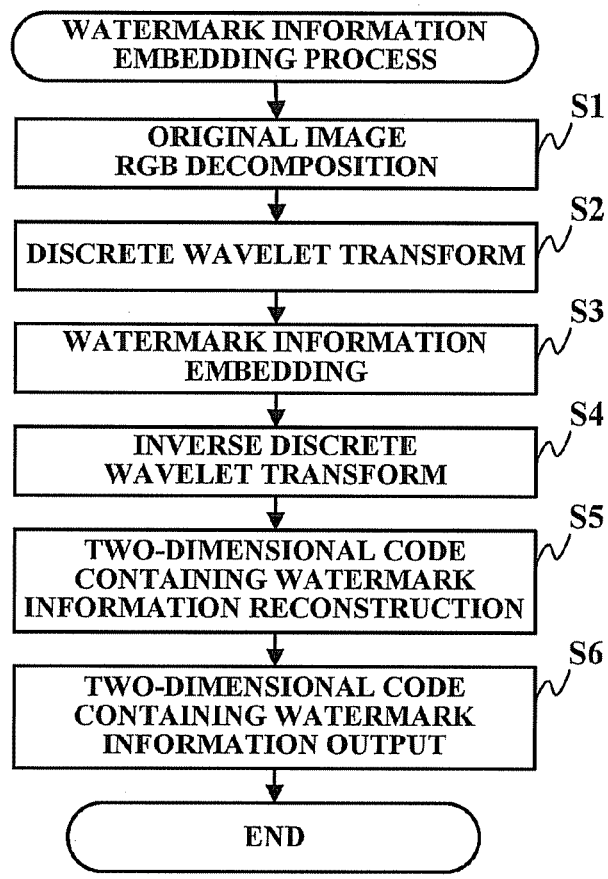
FIG. 5 is a flowchart showing one example of a watermark information embedding process according to the embodiment.
Figure 6:
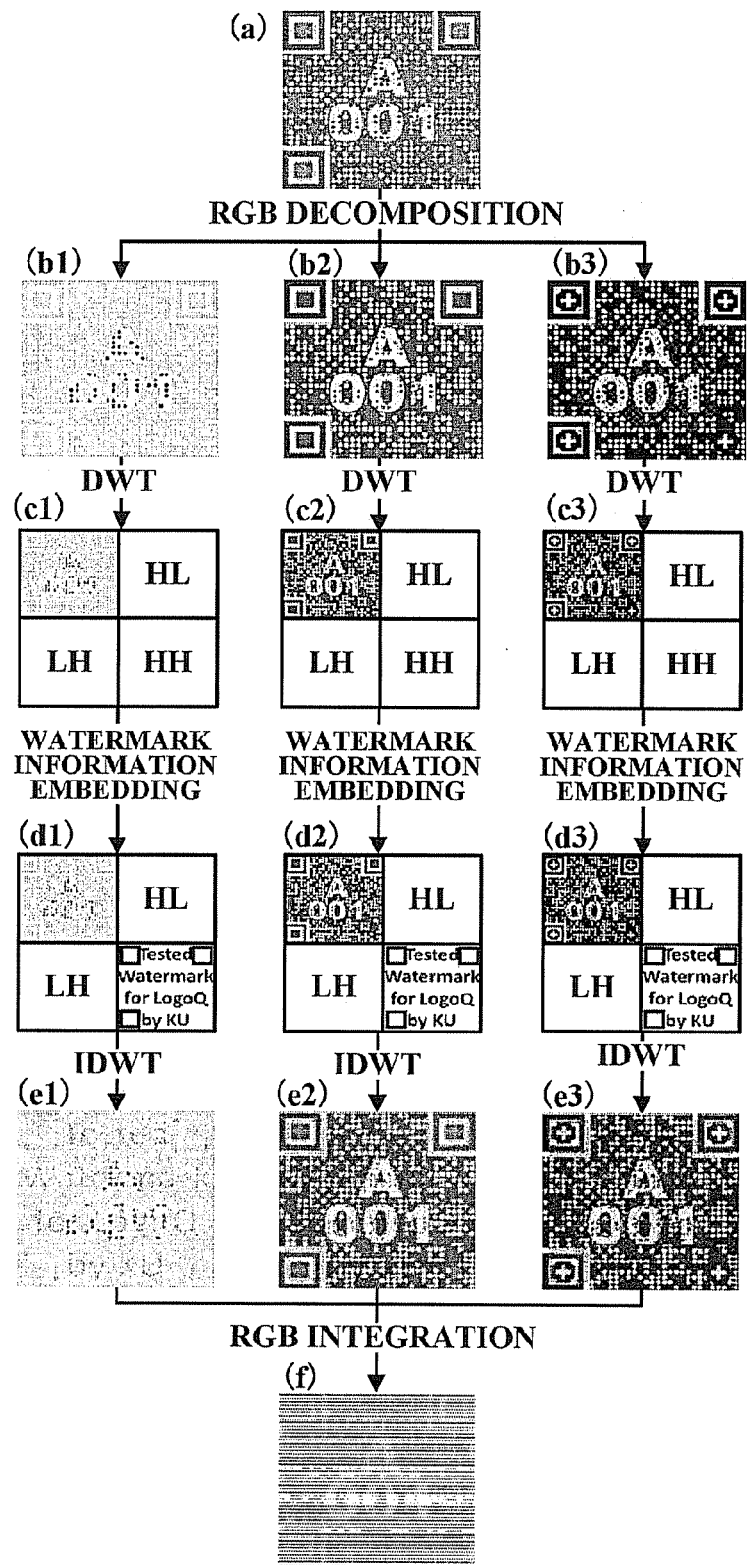
FIG. 6 is a schematic drawing for explaining a watermark information embedding procedure according to the embodiment.

FIG. 5 is a flowchart showing one example of a watermark information embedding process according to the present embodiment, and FIG. 6 is a schematic diagram for explaining the watermark information embedding procedure according to the present embodiment.

In this watermark information embedding process, first the first wavelet transform unit 12 shown in FIG. 1 performs RGB decomposition on the original image of the two-dimensional code shown in FIG. 6(a) through the color component separation unit 120 (step S1 in FIG. 5, FIGS. 6(b1) to 6(b3)).

Next, the first wavelet transform unit 12 performs a discrete wavelet transform on the separate R, G and B color components of the original image of the two-dimensional code, and decomposes the original image of the two-dimensional code into the various frequency components composed of the LL component, the LH component, the HL component and the HH component (step S2 in FIG. 5; FIGS. 6(c1) to 6(c3)).

Next, the watermark information embedding unit 14 shown in FIG. 1 embeds, as a high frequency component in the oblique direction, the watermark information input from the watermark information input unit 13 shown in FIG. 1 in only the HH component of the frequency components decomposed by the first wavelet transform unit 12, using the difference information for each frequency component (step S3 in FIG. 5; FIGS. 6(d1) to 6(d3)).

Furthermore, the two-dimensional code recomposing unit 15 in FIG. 1 accomplishes an inverse discrete wavelet transform through the inverse wavelet transform unit 150 using the HH component in which the watermark information is embedded, and the various high-frequency components other than the HH component, that is to say the LL component, the LH component and the HL component (step S4 in FIG. 5; FIGS. 6(e1) to 6(e3)).

Following this, the two-dimensional code recomposing unit 15 performs RGB integration through the color component integration unit 151 and recomposes the two-dimensional code containing watermark information (step S5 in FIG. 5; FIG. 6(f)).

Furthermore, the two-dimensional code output unit 16 outputs the two-dimensional code containing watermark information through printing on a paper medium such as high-quality printing paper (step S6).

The watermark information extracting device 20 in FIG. 4 starts a watermark information extraction process when the two-dimensional code containing watermark information is input into and captured by the two-dimensional code capture unit 21.

Figure 7:
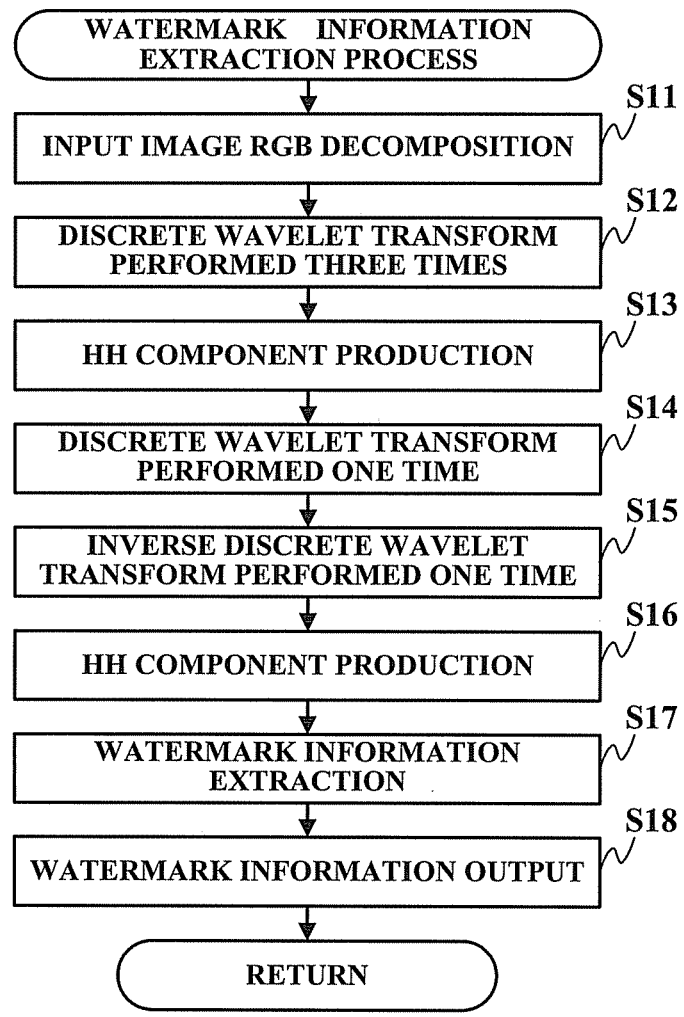
FIG. 7 is a flowchart showing one example of a watermark information extraction process according to the embodiment.
Figure 8:
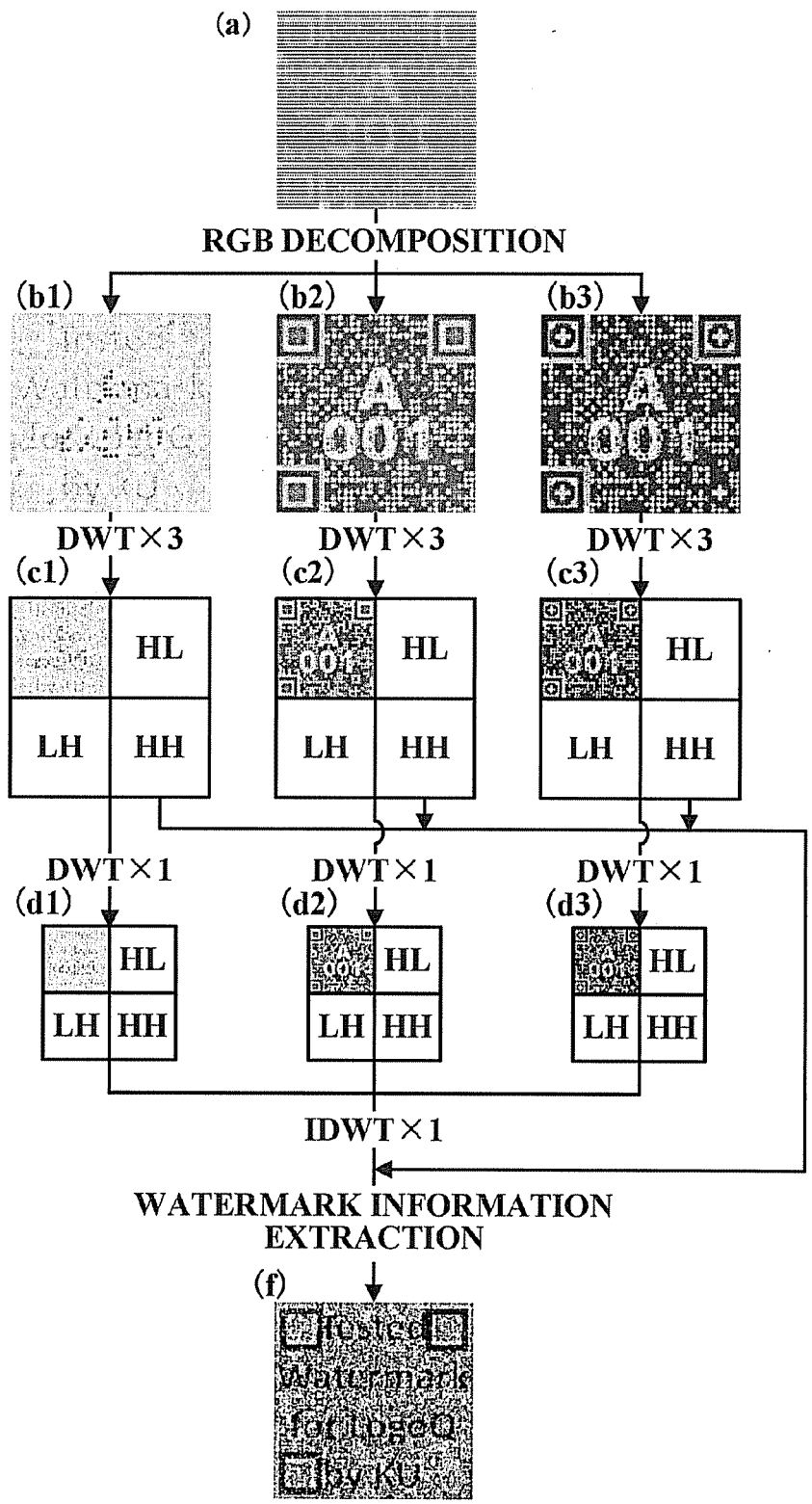
FIG. 8 is a schematic drawing for explaining a watermark information extraction procedure according to the embodiment.

FIG. 7 is a flowchart showing one example of a watermark information extraction process according to the present embodiment. FIG. 8 is a schematic diagram for explaining the watermark information extraction procedure according to the present embodiment.

In this watermark information extraction process, first the second wavelet transform unit 22 accomplishes RGB decomposition on the high-resolution input image with, for example, 2048 px×2048 px (M=N=2048) shown in FIG. 8(a), through the color component separation unit 220 (step S11 in FIG. 7; FIGS. 8(b1) to 8(b3)).

Next, the second wavelet transform unit 22 shrinks the size of the input image to 256 px×256 px by executing a discrete wavelet transform three times (step S12 in FIG. 7; FIGS. 8(c1) to 8(c3)), and following this retrieves the HH component (=HH component A) (step S13 in FIG. 7).

In addition, the second wavelet transform unit 22 shrinks the size of the input image to 128 px×128 px by executing the discrete wavelet transform one more time (step S14 in FIG. 7; FIGS. 8(d1) to 8(d3)).

Next, the second wavelet transform unit 22 returns the size of the input image to 256 px×256 px by executing an inverse discrete wavelet transform one time (step S15 in FIG. 7), and following this retrieves the HH component (=HH component B) (step S16 in FIG. 7).

Furthermore, the watermark information extraction unit 23 extracts watermark information by acquiring the sum of the HH component A retrieved in the process in step S13 and the HH component B retrieved in the process in step S16 as an extracted image signal showing the extracted image (step S17 in FIG. 7; FIG. 8(e)). As has already been explained, it would be fine to use the HH component C in place of the HH component B.

Furthermore, the watermark information output unit 24 outputs the watermark information extracted in the watermark information extraction unit 23 (step S18).

The watermark information embedding device 10 explained above has a color component separation unit 120 and a color component integration unit 151 in the first wavelet transform unit 12 and the two-dimensional code recomposing unit 15, respectively. The watermark information extracting device 20 is provided with a color component separation unit 220 in the second wavelet transform unit 22. However, the color component separation units 120 and 220 and the color component integration unit 151 may also be provided separately. In addition, when the two-dimensional code is formed in monochrome, the color component separation units 120 and 220 and the color component integration unit 151 do not necessarily need to be provided. At this time, weighting of embedding strength through a color weighting coefficient is unnecessary. In addition, the watermark information processing system provided with a watermark information embedding device 10 and a watermark information extracting device 20 may also have the color component separation units 120 and 220 provided in common rather than as separate devices.

Next, changes in the watermark information extracted using the copied two-dimensional code containing watermark information is observed in a watermark information processing system that executes the above-described actions.

Figure 9:
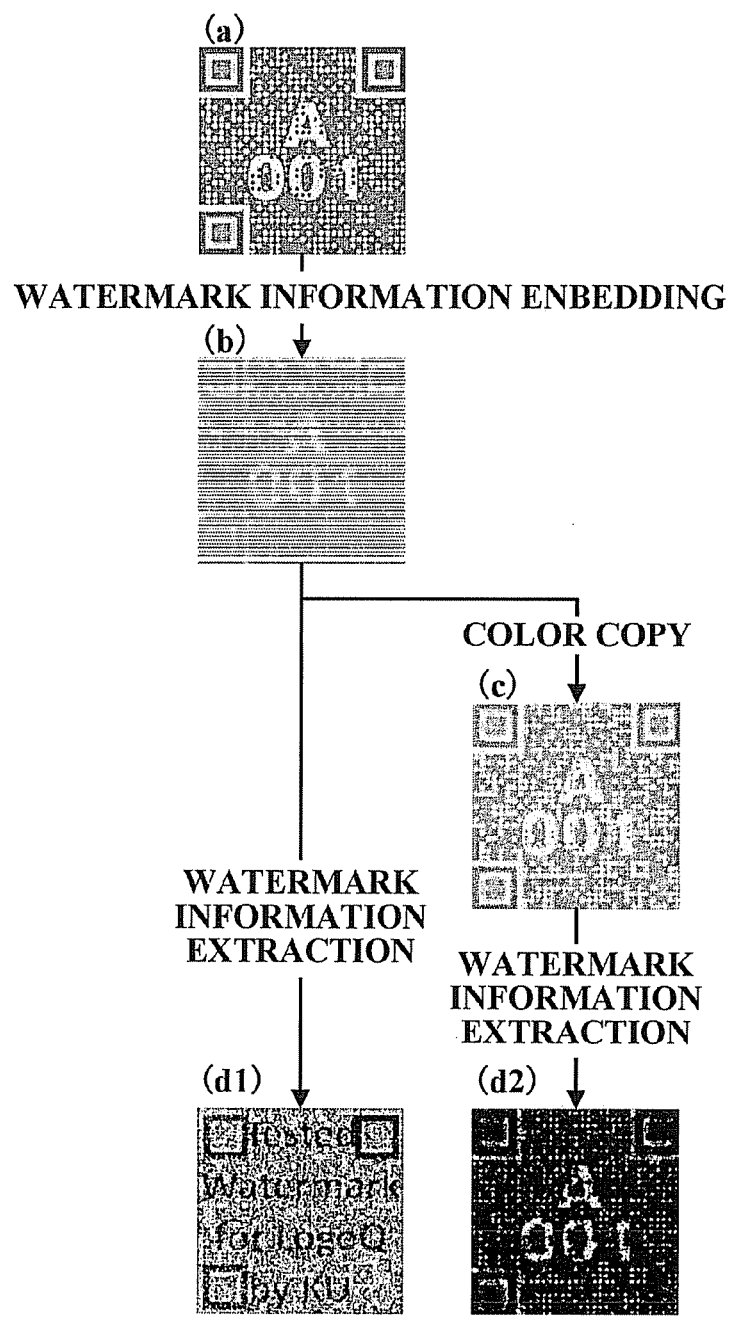
FIG. 9 is a drawing for explaining a test procedure for observing changes in watermark information extracted using a copied two-dimensional code containing watermark information according to the embodiment.

FIG. 9 is a drawing for explaining a test procedure for observing changes in watermark information extracted using a copied two-dimensional code containing watermark information according to this embodiment.

First, as shown in FIGS. 9(a) and 9(b), in the watermark information embedding device 10, watermark information is embedded in the original image of the two-dimensional code and is printed on high-quality printing paper.

Next, as shown in FIG. 9(c), the two-dimensional code containing watermark information printed on the high-quality printing paper is copied (envisioning an illegal copy) using a copier (color copier made by Sharp Corp.) with an input/output resolution of around 600 dpi.

Furthermore, as shown in FIGS. 9(d1) and 9(d2), in the watermark information extracting device 20, watermark information is extracted from both the "pre-copy" two-dimensional code containing watermark information using a copier, and the "post-copy" two-dimensional code containing watermark information.

In the "post-copy" two-dimensional code containing watermark information, it is possible to confirm that watermark information has been lost through copying, as shown in FIG. 9(d2). This is because the background lighting of the embedded part is extremely high. That is to say, through a process of color adjustment made by a copier, the contrast of the image rises, so watermark information embedded in parts near white are lost.

In addition, the reason there is noise in the image as a whole when extracting watermark information from the "post copy" two-dimensional code containing watermark information is because of the shading representation method (shading pattern) of copiers. That is to say, copiers each have their own unique shading pattern, as shown in FIG. 10. The shading pattern of the color copier made by Sharp used in the present embodiment expresses shading through oblique lines, as shown in FIG. 10(a), so HH components other than the watermark information are generated when extracting watermark information, causing the noise from this HH component to become extremely strong.

The shading pattern shown in FIG. 10(b) is that of a color copier made by Ricoh Co., and like that of the color copier made by Sharp, expresses shading through oblique lines. The shading pattern shown in FIG. 10(c) is that of a color copier made by Xerox Corp., and unlike the color copiers made by Ricoh and Sharp, expresses shading through horizontal lines. The shading pattern shown in FIG. 10(d) is that of a color copier made by Canon Inc., and unlike the color copiers made by Ricoh and Sharp, as well as the color copier made by Xerox, expresses shading through dots.

FIG. 11 is a drawing showing an example of change in the watermark information caused by copying according to this embodiment. FIG. 11(a) shows an image extracted from a two-dimensional code containing watermark information copied by a color copier made by Ricoh, FIG. 11(b) shows an image extracted from a two-dimensional code containing watermark information copied by a color copier made by Xerox, and FIG. 11(c) shows an image extracted from a two-dimensional code containing watermark information copied by a color copier made by Canon. As shown in FIG. 11, it can be confirmed that watermark information is lost not just from the two-dimensional code containing watermark information copied by the color copier made by Ricoh, which has the same shading pattern as the color copier made by Sharp used in the present embodiment, but also from the two-dimensional code copied by color copiers made by Xerox and Canon, which have different shading patterns.

It is possible to greatly improve the detection accuracy of illegally copied two-dimensional codes because in addition to factors such as an increase in contrast caused by copying and differences in shading expression methods among copiers, the loss of high-resolution information during the process of copying high-resolution two-dimensional codes also becomes a factor.

As explained above, with the watermark information processing system according to the present embodiment, the watermark information embedding device 10 decomposes the original image of the two-dimensional code into RGB color components in the first wavelet transform unit 12 and then implements a discrete wavelet transform on each of the R, G and B color components, decomposing the image into frequency components, namely an LL component, an LH component, an HL component and an HH component.

Next, the watermark information embedding device 10, in the watermark information embedding unit 14, embeds watermark information as a high-frequency component in the oblique direction in the HH component out of the frequency components decomposed, in each color component, by the first wavelet transform unit 12, with a weighted embedding strength obtained by weighting in accordance with the usage frequency of each color component in the original image of the two-dimensional code.

Furthermore, the watermark information embedding device 10, in the two-dimensional code recomposing unit 15, performs an inverse discrete wavelet transform on the HH component, in which the watermark information is embedded by the watermark information embedding unit 14, and on the LL component, LH component and HL component, which were decomposed by the first wavelet transform unit 12, and then recomposes the two-dimensional code containing watermark information by integrating the RGB color components.

In this manner, the watermark information embedding device 10 embeds watermark information as a high-frequency component in the oblique direction only in the HH component, whose wavelet coefficient value (coefficient value) is small compared to the LH component and the HL component, and through this it is possible to prevent the loss of watermark information from the HH component of the regular two-dimensional code containing watermark information that has not been copied, by appearing of information other than the watermark information as noise.

In contrast, information other than the watermark information appears extremely strongly in the HH component of an image of the irregular two-dimensional code containing watermark information copied (illegally copied) by a copying machine whose shading expression method differs from the shading expression of the image of the pre-copy, regular two-dimensional code containing watermark information. Consequently, watermark information is lost.

Through the above, it is possible to detect copying of the two-dimensional code. That is to say, the watermark information embedding device 10 can provide a two-dimensional code that enables detection of copying.

Furthermore, the watermark information embedding device 10 can make deterioration of the image of the two-dimensional code obtained through recomposing less noticeable by embedding the watermark information in the HH component that is the high-frequency component as a high-frequency component in the oblique direction.

In addition, the watermark information embedding device 10 can provide a two-dimensional code that can assure accuracy in extracting watermark information while reducing changes in the quality of the design of the two-dimensional code, by embedding watermark information with a weighted embedding strength in which weighting is in accordance with the usage frequency of the various color components in the original image of the two-dimensional code.

The post-copy image in general appears with the characteristic that contrast has increased compared to the pre-copy image. Consequently, the watermark information embedding device 10, in the watermark information embedding unit 14, adjusts the background brightness of the original image of the two-dimensional code that is the target of embedding and the embedding strength of the embedded information to a range where the loss of information due to copying is large. By using this kind of two-dimensional code, when the two-dimensional code is copied, the watermark information is lost from the "post-copy" two-dimensional code containing watermark information. Therefore, when an extraction process of watermark information is executed, it is possible to detect whether or not copying of the two-dimensional code has occurred by whether or not the watermark information can be extracted. Accordingly, the watermark information embedding device 10 can provide a two-dimensional code with which detection of copying is possible.

The watermark information extracting device 20, in the second wavelet transform unit 22, performs a discrete wavelet transform $\log_2$ (M/m) times on the input image of the two-dimensional code containing watermark information captured by the two-dimensional code capture unit 21, and produces the HH component A. In addition, the watermark information extracting device 20, in the second wavelet transform unit 22, performs a discrete wavelet transform $k+\log_2$ (M/m) times on the input image of the two-dimensional code containing watermark information, and then performs an inverse discrete wavelet transform k times to produce the HH component C.

Furthermore, the watermark information extracting device 20, in the watermark information extraction unit 23, extracts watermark information from the sum of the HH component A, which is produced by performing a discrete wavelet transform $\log_2$ (M/m) times, and the HH component C, which is produced by performing a discrete wavelet transform $k+\log_2$ (M/m) times and then performing an inverse discrete wavelet transform k times.

In this manner, the watermark information extracting device 20 shrinks the size of the input image of the two-dimensional code containing watermark information to the size of the original image of the two-dimensional code by performing discrete wavelet transforms. Through this procedure, delicate differences in information between pre- and post-copy are preserved, while differences in the accuracy of extracting the embedded information between pre- and post-copy are enlarged. The watermark information extracting device 20 can thus improve the accuracy of detecting whether or not the two-dimensional code has been copied.

In addition, the watermark information extracting device 20, in the second wavelet transform unit 22, can extract more clear watermark information by acquiring the sum of the HH component A, which is produced by performing a discrete wavelet transform $\log_2$ (M/m) times, and the HH component C, which is produced by performing a discrete wavelet transform $k+\log_2$ (M/m) times and then performing an inverse discrete wavelet transform k times, as the image signal for extraction showing the image for extraction in the watermark information extraction unit 23.

The present invention is not limited to the above-described embodiment, for various variations and applications are possible. Variations on the above-described embodiment to which the present invention can be applied are explained below.

In the above-described embodiment, the watermark information embedding device 10 for embedding watermark information and the watermark information extracting device 20 for extracting watermark information were described as being separate, but a function for embedding watermark information and a function for extracting such may both be provided in a single image processing device. Such an image processing device can be called a watermark information processing system.

In addition, the watermark information embedding device 10 and the watermark information extracting device 20 in the above-described embodiment can be composed of a computer CPU (Central Processing Unit) or MPU (Micro Processing Unit), RAM (Random Access Memory), ROM (Read Only Memory) and/or the like, and can be realized by running a program stored in the RAM or ROM.

Accordingly, a program that causes a computer to operate so as to achieve the above-described functions can be recorded on a recording medium such as a CD-ROM (Compact Disc Read Only Memory), for example, and can be realized by being read by a computer. As recording media for recording the above-described program, it is possible to use besides a CD-ROM a DVD-ROM (Digital Versatile Disc-Read Only Memory), Blu-ray Disc, flexible disk, hard disk, magnetic tape, optomagnetic disk, non-volatile memory card and/or the like.

In addition, not only when the functions of the above-described embodiment are realized by the computer executing the supplied program, but also when the functions of the above-described embodiment are realized in association with the OS (Operating System) on which that program is running on the computer or other application software, or when the functions of the above-described embodiment are realized by the processes of the supplied program being entirely or partially performed through a function expansion board or a function expansion unit of the computer, the program is contained in the embodiment of the present invention.

In addition, all or a portion of the program may be executed on another computer for the present invention to be used in a network environment. For example, the image input process may be executed on a remote terminal computer, and various other determinations, log recording and/or the like may be performed on one or more computers in another center.

Figure 12:
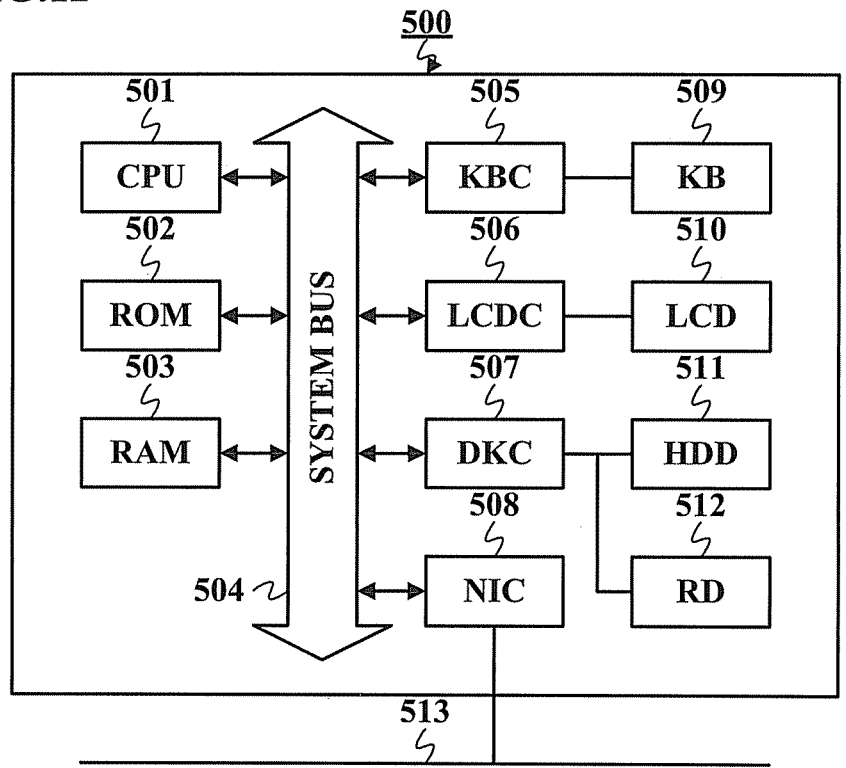
FIG. 12 is a block diagram showing an example of the configuration of a computer that can realize a watermark information embedding device and a watermark information extracting device according to the embodiment.

For example, the image processing device indicated by the present embodiment may have a computer function 500 such as that shown in FIG. 12, and the operations of the present embodiment may be implemented by the CPU 501 thereof.

As shown in FIG. 12, the computer function 500 is composed so that a CPU 501, a ROM 502, a RAM 503, a keyboard controller (KBC) 505 of a keyboard (KB) 509, an LCD controller (LCDC) 506 of an LCD display (LCD) 510 as a display unit, a disk controller (DKC) 507 for a hard disk drive (HDD) 511 and a removable disk (RD) 512, and a network interface card (NIC) 508 are connected so as to be capable of mutually communicating via a system bus 504.

The CPU 501 comprehensively controls the various constituent units connected to the system bus by executing software stored on the ROM 502 or the HD 511, or software supplied by the RD 512.

That is to say, the CPU 501 accomplishes control to realize the operations of the present embodiment by executing a processing program for performing the above-described operations after reading such from the ROM 502, or the HD 511, or the RD 512.

The RAM 503 functions as a main memory or work area for the CPU 501. The KBC 505 controls instruction input from the KB 509 or an unrepresented pointing device and/or the like. The LCDC 506 controls displays on the LCD 510.

The DKC 507 controls access to the HDD 511 and the RD 512 where boot programs, various applications, user files, network managing programs and processing programs for the present embodiment are stored. The NIC 508 exchanges data in both directions with other devices on the network 513.

Furthermore, the above-described embodiment is merely one example of concrete cases embodying the present invention, and should not be interpreted as limiting the technical scope of the present invention. That is to say, the present invention can be implemented in a variety of forms without deviating from the technical idea or primary characteristics thereof.

The invention claimed is:

1. A watermark information embedding device, comprising:
    a color component separator for separating an original image of a two-dimensional code into color components;
    a first wavelet transformer for performing, for each of the color components separated by the color component separator, a wavelet transform on the original image of the two-dimensional code to decompose this image into various frequency components;
    a watermark information embedder for embedding watermark information, as a high-frequency component in an oblique direction, in a high-frequency component in the oblique direction of the each of the color components out of the various frequency components decomposed by the first wavelet transformer with an embedding strength weighted in accordance with a usage frequency of the each of the color components in the original image of the two-dimensional code;
    an inverse wavelet transformer recomposing the two-dimensional code containing watermark information by performing an inverse wavelet transform on frequency components other than the high-frequency component in the oblique direction, out of the various frequency components decomposed by the first wavelet transformer, and the high-frequency component in the oblique direction in which the watermark information is embedded by the watermark information embedder; and
    a color component integrator for integrating the two-dimensional code containing watermark information for the each of the color components recomposed by the inverse wavelet transformer.

2. The watermark information embedding device according to claim 1, wherein the watermark information embedder executes embedding of the watermark information for a wavelet coefficient obtained through the wavelet transform, and when the wavelet coefficient in the high-frequency component in the oblique direction of the original image of the two-dimensional code after the wavelet transform has been executed (j+1) times (j is a natural number) by the first wavelet transformer is $w_{m,n}^{(j+1,d)}$ (where (m,n) is the position of a pixel and d is an index indicating that the wavelet coefficient is a coefficient of a high-frequency component in an oblique direction), the watermark binary image is $T_{m,n}$, the color weighting coefficient is a and the embedding strength is bit, the wavelet coefficient $W_{m,n}^{\wedge}(j+1,d)$ of the two-dimensional code containing watermark information is expressed by the following formula:

$$W_{m,n}^{(j+1,d)} + \begin{cases} w_{m,n}^{(j+1,d)} + \text{bit} \times \alpha & \text{if } T_{m,n} = 0(\text{BLACK}) \\ w_{m,n}^{(j+1,d)} & \text{otherwise} \end{cases} \quad [\text{Formula 1}]$$

3. A watermark information processing system, comprising:
    a watermark information embedding device and a watermark information extraction device, wherein
    the watermark information embedding device comprises:
    a color component separator for separating an original image of a two-dimensional code into color components;
    a first wavelet transformer for performing, for each of the color components separated by the color component separator, a wavelet transform on the original image of the two-dimensional code to decompose this image into various frequency components;
    a watermark information embedder for embedding watermark information, as a high-frequency component in an oblique direction, in a high-frequency component in the oblique direction of the each of the color components out of the various frequency components decomposed by the first wavelet transformer with an embedding strength weighted in accordance with a usage frequency of the each of the color components in the original image of the two-dimensional code;
    an inverse wavelet transformer recomposing the two-dimensional code containing watermark information by performing an inverse wavelet transform on frequency components other than the high-frequency component in the oblique direction, out of the various frequency components decomposed by the first wavelet transformer, and the high-frequency component in the oblique direction in which the watermark information is embedded by the watermark information embedder; and
    a color component integrator for integrating the two-dimensional code containing watermark information for the each of the color components recomposed by the inverse wavelet transformer, and
    the watermark information extraction device comprises:
    a two-dimensional code capturer for capturing an input image of the two-dimensional code containing watermark information recomposed by the inverse wavelet transformer;
    a second wavelet transformer for performing a wavelet transform on the input image of the two-dimensional code containing watermark information captured by the two-dimensional code capturer and producing high-frequency components; and
    a watermark information extractor for extracting watermark information from a high-frequency component in an oblique direction out of the high-frequency components produced by the second wavelet transformer.

4. The watermark information processing system according to claim 3, wherein when the size of the original image of the two-dimensional code is m×m and the size of the input image of the two-dimensional code containing watermark information captured by the two-dimensional code capturer is M×M (M=m×2j (j is a natural number)), the second wavelet transformer performs a wavelet transform $\log_2$ (M/m) times on the input image of the two-dimensional code containing watermark information.

5. The watermark information processing system according to claim 4, wherein the second wavelet transformer performs a wavelet transform k+$\log_2$ (M/m) times (k is a natural number) on the input image of the two-dimensional code containing watermark information captured by the two-dimensional code capturer and then performs an inverse wavelet transform k times; and the watermark information extractor extracts watermark information from the sum of the high-frequency component in the oblique direction produced by performing the wavelet transform $\log_2$ (M/m) times, and the high-frequency component in the oblique direction produced by performing the wavelet transform k+$\log_2$ (M/m) times and then performing the inverse wavelet transform k times.

6. A watermark information embedding method, comprising:

a color component separation step for separating an original image of a two-dimensional code into color components;

a first wavelet transform step for performing, for each of the color components separated by the color component separation step, a wavelet transform on the original image of the two-dimensional code to decompose this image into various frequency components;

a watermark information embedding step for embedding watermark information, as a high-frequency component in an oblique direction, in a high-frequency component in the oblique direction of the each of the color components out of the various frequency components decomposed by the first wavelet transform step with an embedding strength weighted in accordance with a usage frequency of the each of the color components in the original image of the two-dimensional code;

an inverse wavelet transform step for recomposing the two-dimensional code containing watermark information by performing an inverse wavelet transform on frequency components other than the high-frequency component in the oblique direction, out of the various frequency components decomposed by the first wavelet transform step, and the high-frequency component in the oblique direction in which the watermark information is embedded by the watermark information embedding step; and a color component integration step for integrating the two-dimensional code containing watermark information for the each of the color components recomposed by the inverse wavelet transform step.

7. A non-transitory computer-readable recording medium storing a program for causing a computer to execute a procedure comprising:

a color component separation procedure for separating an original image of a two-dimensional code into color components;

a first wavelet transform procedure for performing, for each of the color components separated by the color component separation procedure, a wavelet transform on the original image of the two-dimensional code to decompose this image into various frequency components;

a watermark information embedding procedure for embedding watermark information, as a high-frequency component in an oblique direction, in a high-frequency component in the oblique direction of the each of the color components out of the various frequency components decomposed by the first wavelet transform procedure with an embedding strength weighted in accordance with a usage frequency of the each of the color components in the original image of the two-dimensional code;

an inverse wavelet transform procedure for recomposing the two-dimensional code containing watermark information by performing an inverse wavelet transform on frequency components other than the high-frequency component in the oblique direction, out of the various frequency components decomposed by the first wavelet transform procedure, and the high-frequency component in the oblique direction in which the watermark information is embedded by the watermark information embedding procedure; and a color component integration procedure for integrating the two-dimensional code containing watermark information for the each of the color components recomposed by the inverse wavelet transform procedure.

* * * * *